United States Patent
Sabates et al.

(10) Patent No.: US 6,889,591 B2
(45) Date of Patent: May 10, 2005

(54) RECOILLESS IMPACT DEVICE

(76) Inventors: Feliciano Sabates, 160 Victory Farm La., Statesville, NC (US) 28625; David Wilson, 5 Alfreda Ct., Morrisonville, NY (US) 12962; Charles Mossey, 27 Domenica Dr., Waterford, NY (US) 12188; Mark Johnson, 55 Drinker Dr. South, Rensselaer, NY (US) 12144; Charles VanCampen, 3A Clinton Ave., Watevliet, NY (US) 12180; John J. Keating, 8 Stow Ave., Troy, NY (US) 12180; Daniel Crayon, 19 Captains Blvd., Waterford, NY (US) 12188; Kevin Miner, 1477 Sunset Rd., Castleton, NY (US) 12033

( * ) Notice: Subject to any disclaimer, the term of this patent is extended or adjusted under 35 U.S.C. 154(b) by 0 days.

(21) Appl. No.: 10/441,629

(22) Filed: May 20, 2003

(65) Prior Publication Data
US 2004/0069134 A1 Apr. 15, 2004

Related U.S. Application Data

(63) Continuation of application No. 10/008,352, filed on Nov. 13, 2001, now Pat. No. 6,564,688, which is a continuation-in-part of application No. 09/710,073, filed on Nov. 10, 2000, now Pat. No. 6,631,668.

(51) Int. Cl.$^7$ ................................................. B64D 1/04
(52) U.S. Cl. .......................................... 89/1.14; 173/90
(58) Field of Search ........................... 89/1.14; 29/254; 173/90

(56) References Cited

U.S. PATENT DOCUMENTS

| | | | |
|---|---|---|---|
| 3,815,469 A | * | 6/1974 | Schubert et al. ........... 89/1.701 |
| 4,554,860 A | * | 11/1985 | Johansson et al. ............ 89/1.7 |
| 4,850,437 A | * | 7/1989 | Sudnishnikov et al. ....... 173/13 |
| 5,088,174 A | * | 2/1992 | Hull et al. ..................... 29/254 |
| 5,099,764 A | * | 3/1992 | Dale et al. ................... 102/374 |
| 5,177,850 A | * | 1/1993 | Hull et al. ..................... 29/254 |
| 5,329,685 A | | 7/1994 | Gillespie |
| 5,398,773 A | | 3/1995 | Baker |

(Continued)

FOREIGN PATENT DOCUMENTS

| | | | | |
|---|---|---|---|---|
| EP | 0256894 A1 | * | 2/1988 | |
| GB | 2 291 958 A | | 2/1996 | |
| GB | 2291958 A | * | 2/1996 | ........... F41B/15/00 |
| WO | WO 238316 A2 | * | 5/2002 | |

Primary Examiner—Peter M. Poon
Assistant Examiner—Troy Chambers
(74) Attorney, Agent, or Firm—Moore & Van Allen PLLC; Michael G. Johnston

(57) ABSTRACT

An apparatus for generating an impact against a target object comprises a driver reciprocally disposed in a housing. The driver includes a hollow tube having a closed end and a nozzle seating the other end. A piston is slidably positioned in the tube. Propellant is disposed between the piston and the closed end of the tube and fluid is disposed between the nozzle and the piston. A rupture disc is provided for sealing the nozzle which is adapted to rupture when the pressure in the tube exceeds a predetermined pressure. A striker is also mounted in the housing so that in a retracted position of the striker a head portion is proximate the driver and a portion of a shaft extends outwardly from the housing. The striker member is movable between the retracted position and an extended position. The propellant is ignited so that combustion gases build pressure in the tube between the piston and the closed end of the tube causing the pressure in the tube to exceed the predetermined pressure for rupturing the disc. This causes the piston to move toward the nozzle and fluid to be expelled through the nozzle for moving the driver against the head portion of the striker. The driver transfers energy to the striker for moving the striker to the extended position at high velocity for driving the end of the striker with great force against the target object. Recoil action is cushioned by the fluid exiting the nozzle.

26 Claims, 13 Drawing Sheets

U.S. PATENT DOCUMENTS

| | | | | |
|---|---|---|---|---|
| 5,415,241 A | * | 5/1995 | Ruffu et al. | 173/212 |
| 5,987,723 A | * | 11/1999 | McNally et al. | 29/254 |
| 6,318,228 B1 | * | 11/2001 | Thompson | 89/1.14 |
| 6,564,688 B2 | * | 5/2003 | Sabates et al. | 89/1.14 |
| 6,631,668 B1 | * | 10/2003 | Wilson et al. | 89/1.14 |

* cited by examiner

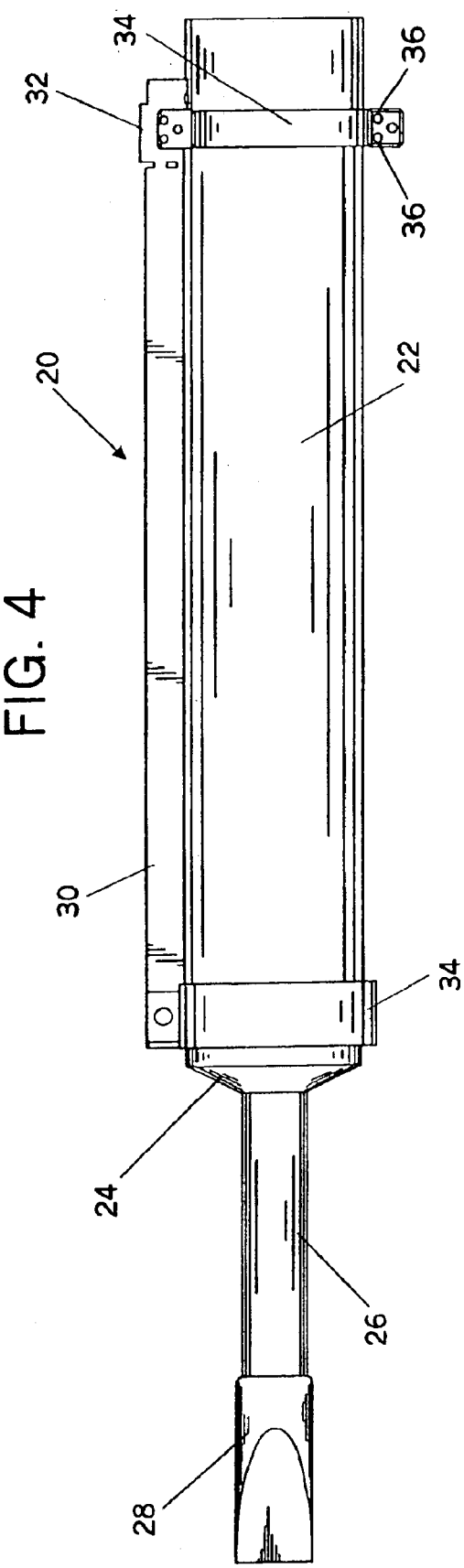
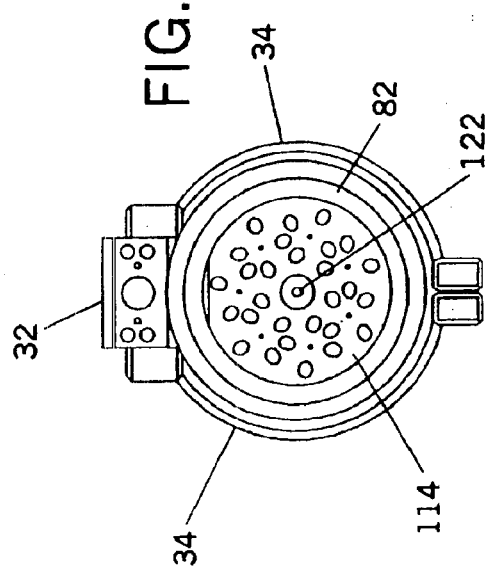
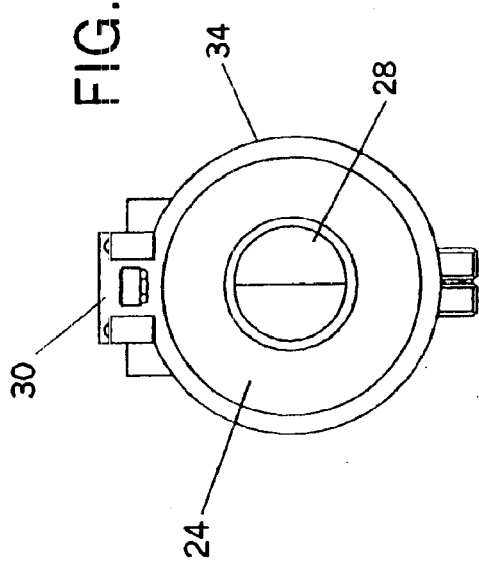

RECOILLESS IMPACT DEVICE

CROSS-REFERENCES

This application is a continuation application of U.S. patent application Ser. No. 10/008,352, filed Nov. 13, 2001, now U.S. Pat. No. 6,564,688, which is a continuation-in-part application of U.S. patent application No. 09/710,073, filed Nov. 10, 2000 now U.S. Pat. No. 6,631,668, the contents of both of which are hereby incorporated by reference.

GOVERNMENT RIGHTS

The inventions described herein may be manufactured and used by or for the U.S. Government for U.S. Government purposes.

BACKGROUND

This invention relates generally to hand-held impact devices, and more particularly to hand-held impact devices for gaining entry to locked or barricaded structures.

There is often a need for authorized personnel to rapidly gain access to locked, barricaded or otherwise secured buildings and to damaged structures, particularly in response to illegal activity or an emergency. Portable, hand-held forcible entry devices have been developed that enable law enforcement and emergency personnel to forcibly open a locked or fortified door, barricaded passage, damaged structure, or any other barrier that requires the use of force to gain access to a building or structure.

A typical forcible entry device comprises a piston-driven striker housed within a generally cylindrical case. The end of the striker extends from the front end of the case. A modified, conventional firearm is secured to the other end of the case for discharging the forcible entry device. The modified firearm fires a blank cartridge or other explosive charge which generates a combustion gas for driving the piston-driven striker outwardly of the housing to produce an extreme percussive force. In use, the striker is placed against a target object, such as a locked or barricaded door or damaged structure, and the firearm is fired. The striker extends from the front end of the case with great force and impacts the target object for breaking through the door or structure.

A problem with conventional forcible entry devices is the recoil generated when the device is fired due to the large force necessary to drive the striker. The recoil makes the device difficult for the user to hold and to control in use. Another problem with using forcible entry devices occurs when the target object offers little resistance to the striker. The force generated by the high velocity extension of the striker results in "forward" recoil wherein the device jerks forward in the user's hands. Forward recoil is also a problem when the devices are "dry fired", that is, fired when the striker does not impact a target object.

For the foregoing reasons, there is a need for a new impact generating device for use in forcible entry of locked or damaged structure which is recoilless. The new device should be recoilless in the traditional sense and minimize forward recoil in the case of soft target objects or dry firing. Ideally, the new impact device should also be compact and lightweight, and thus portable enough to be rapidly positioned and deployed to gain access to a structure without the need for an external power source.

SUMMARY

Therefore, it is an object of the present invention to provide an impact generating device which is recoilless.

Another object of the present invention is to provide an impact generating device which minimizes forward recoil, even when impacting soft target objects or when dry fired.

A further object of the present invention is to provide a recoilless impact-generating device which is useful in forcible entry of a locked or damaged structure.

According to the present invention, an apparatus for generating an impact against a target object comprises a housing defining an interior chamber and having a closed first end and an open second end. A drive member is reciprocally disposed in the interior chamber adjacent the second end of the housing for movement relative to the housing from a first firing position to a second driven position. The drive member includes a hollow tube member having a first closed end and a second open end. A nozzle member having a plurality of openings is sealably mounted in the second end of the tube. A piston is disposed in the tube for movement relative to the tube and propellant is disposed between the piston and the closed end of the tube. Fluid is also in the tube between the nozzle member and the piston. Means are provided for sealing the openings in the nozzle member, wherein the nozzle opening sealing means is adapted to rupture when the pressure in the tube exceeds a predetermined pressure. A striker member having a head portion and a shaft portion is mounted within the interior chamber so that in a first retracted position of the striker member the head portion of the striker member is proximate the first end of the drive member and a portion of the shaft portion extends outwardly from the interior chamber through a passage formed in the closed end of the housing. The striker member is movable relative to the housing between the first position and a second extended position where the head portion is adjacent the first end of the housing. Means are provided for igniting the propellant so that combustion gases build pressure in the tube member between the piston and the closed end of the tube member causing the pressure in the tube member to exceed the predetermined pressure for rupturing the nozzle sealing means. This causes the piston to move toward the nozzle member and fluid to be expelled through the nozzle member for moving the drive member against the head portion of the striker member and to the driven position. The drive member transfers energy to the striker member for moving the striker member to the second position at high velocity for driving the end of the striker with great force against the target object. Recoil action in the apparatus is cushioned by the fluid exiting the tube member through the nozzle member as the piston moves toward the nozzle member.

BRIEF DESCRIPTION OF THE DRAWINGS

For a more complete understanding of the present invention, reference should now be had to the embodiments shown in the accompanying drawings and described below. In the drawings:

FIG. 2 is a front elevation view of the recoilless impact device shown in FIG. 1.

FIG. 3 is a rear elevation view of the recoilless impact device shown in FIG. 1.

FIG. 4 is a side elevation view of the recoilless impact device shown in FIG. 1.

DESCRIPTION

The impact generating device according to the present invention is similar to the forcible entry device shown and described in U.S. patent application Ser. No. 09/065,746, the contents of which are hereby incorporated by reference.

Certain terminology is used herein for convenience only and is not to be taken as a limitation on the invention. For example, words such as "upper," "lower," "left," "right," "horizontal," "vertical," "upward," and "downward" merely describe the configuration shown in the Figures. Indeed, the components may be oriented in any direction and the terminology, therefore, should be understood as encompassing such variations unless specified otherwise.

Figure 1:
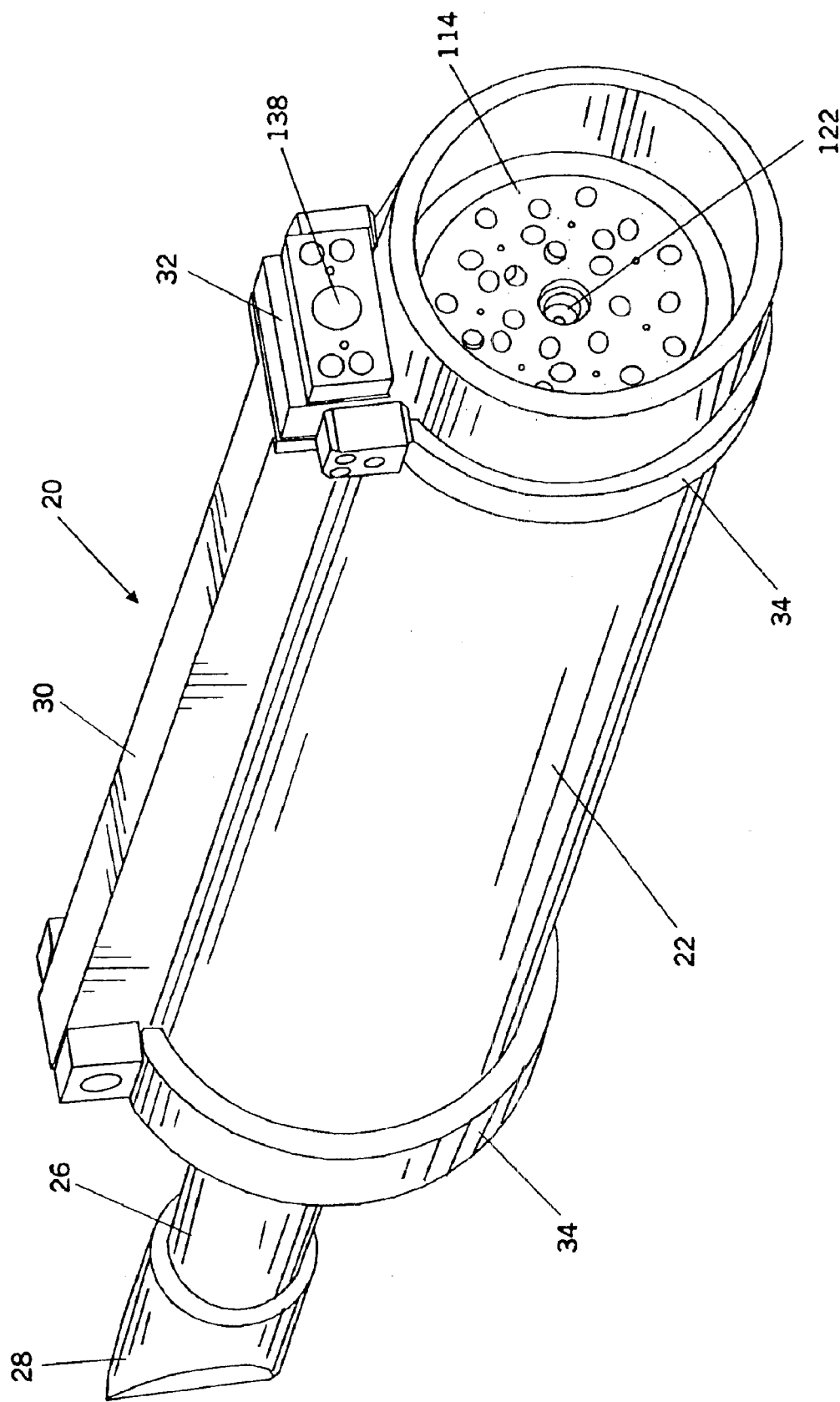
FIG. 1 is a perspective view of an embodiment of a recoilless impact device according to the present invention.

Referring now to the drawings, wherein like reference numerals designate corresponding or similar elements throughout the several views, an embodiment of the impact device according to the present invention for use, for example, in forcible entry of locked or barricaded structures or doors is shown in FIGS. 1–4 and designated generally at 20. The impact device 20 includes a housing 22, a front cap 24 and an elongated striker shaft 26 extending through the cap 24 outwardly of the housing. At the end of the striker shaft 26 is a tip 28. The tip 28 may be any useful shape, depending upon the structure to be opened, removed or cut. For example, a chisel type tip 28 is shown in FIG. 1. The tip 28 may be made removable, as in the present device 20, to ease application of the device to different situations. An outer channel weldment 30 extends from the front end of the housing 22 to a key block assembly 32 at the rear of the housing. The channel weldment 30 is held in place by straps 34 which are secured around the housing 20 by threaded fasteners 36. Unless otherwise specified, all of the parts of the impact device 20 are aluminum except the striker shaft 26 and tip 28 which are steel.

Figure 5:
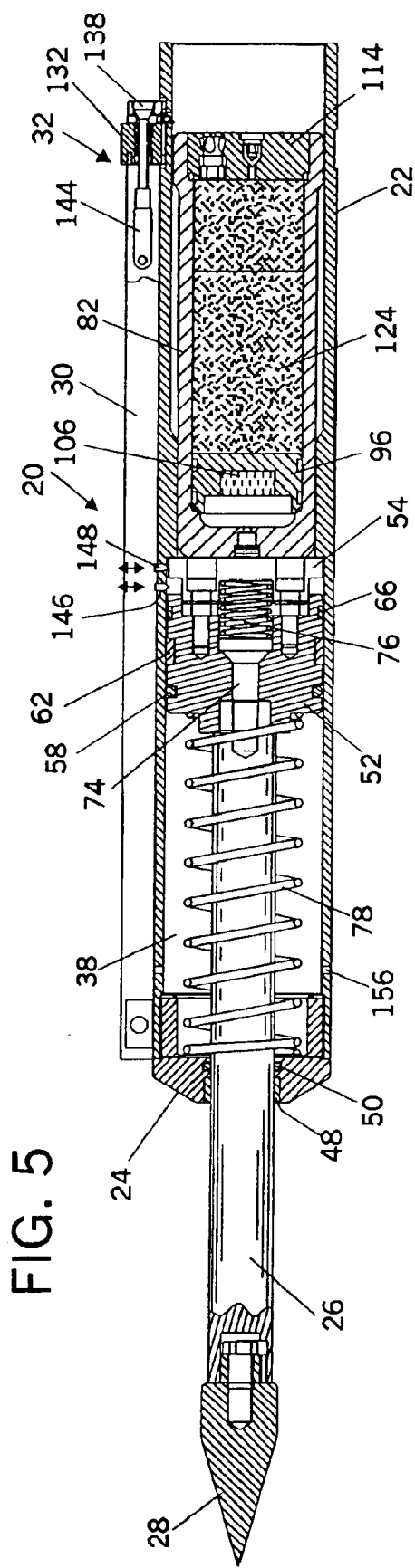
FIG. 5 is a side cross-section view of the recoilless impact device shown in FIG. 1
Figure 8:
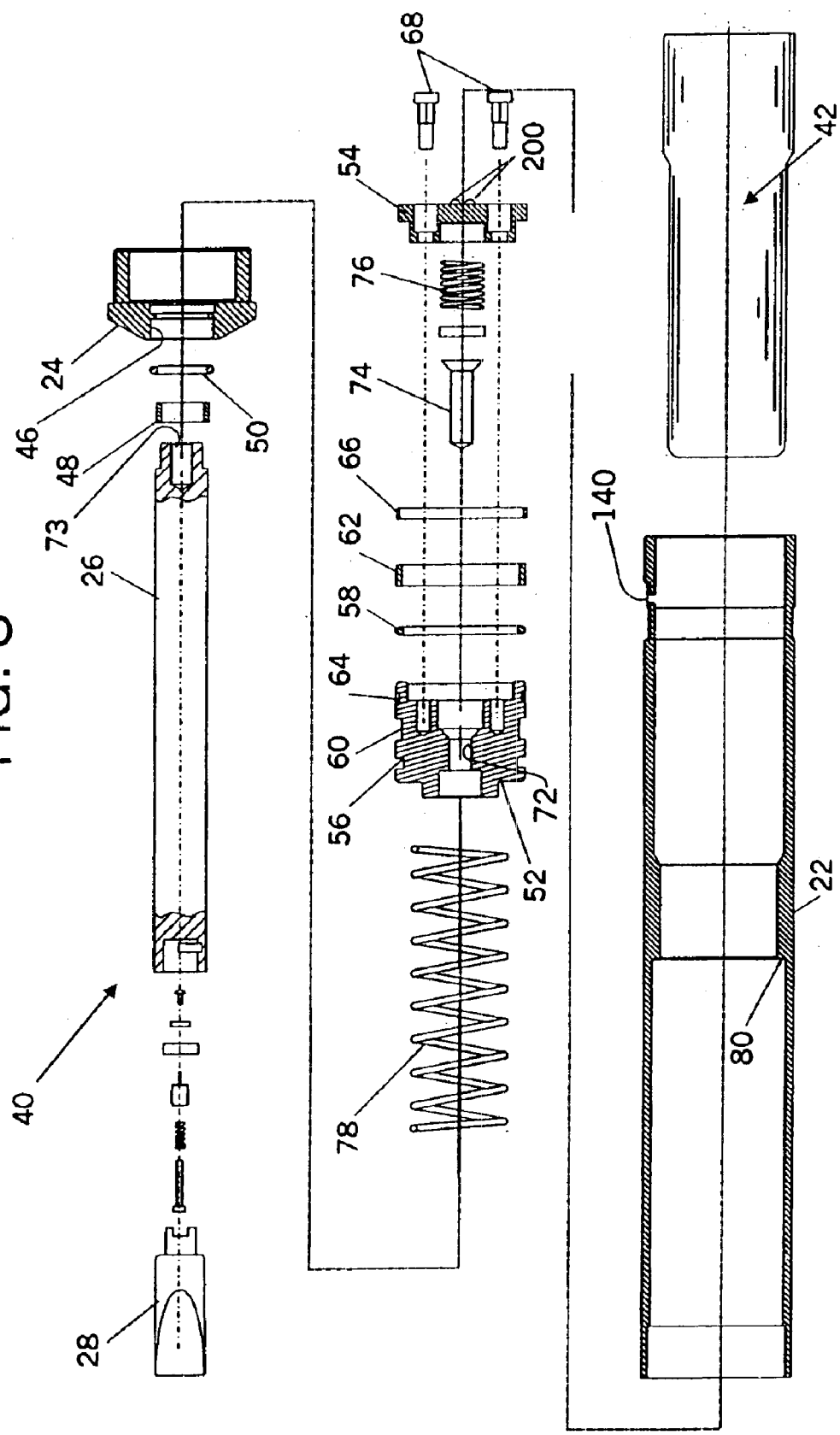
FIG. 8 is an exploded cross-section view of the recoilless impact device shown in FIG. 5.

Referring now to FIGS. 5 and 8, the housing 22 defines a generally cylindrical interior chamber 38. The front end of the housing 22 is sealed by the front cap 24 which is threaded into the housing 22, and the rear end of the housing is open.

A striker assembly 40 and a driver assembly 42 are reciprocally disposed within the chamber 38 at the front and rear of the housing 22, respectively. The striker assembly 40 comprises the striker shaft 26 and a striker head 44. One end of the striker shaft 26 extends outwardly of the housing 22 from the interior chamber 38 through a central opening 46 formed in the front cap 24. A brass bushing 48 fits in the cap opening 46 between the cap 24 and striker shaft 26 to permit the striker shaft to reciprocate freely relative to the front cap. Optionally, the cap 46 may be provided with an annular groove 48 for receiving an o-ring 50 which fits snugly around the striker shaft 26 to seal the space between the cap 24 and striker shaft. However, if the bushing 48 is machined to sufficiently close tolerance with the shaft 26, the o-ring 50 is not necessary. The striker head 44 includes two generally cylindrical pieces, an outer striker head 52 and an inner striker head 54. The outer striker head 52 has three spaced circumferential grooves: a forward groove 56 which holds a rubber wiper ring 58, a middle groove 60 which holds a polymer guide ring 62 and a rear groove 64 which holds a copper contact ring 66 which is insulated from the outer striker head 52. The inner striker head 54 is steel and includes four spaced guide pins 68, only two of which are shown in FIGS. 5 and 8. The guide pins 68 are movably received in corresponding openings 70 in the rear of the outer striker head 52 so that the inner striker head 54 and outer striker head 52 fit reciprocally together. The outer striker head 52 also has an axial pass through opening 72 for receiving a reduced diameter portion of the inner end of the striker shaft 26. The inner end of the striker shaft 26 has an internally threaded axial opening 73 for receiving a shaft screw 74 which passes through the axial opening 72 in the outer striker head 52 thus securing the outer striker head to the striker shaft. A small coil spring 76 is interposed between the inner striker head 54 and outer striker head 52 for biasing the heads apart.

A large coil spring 78 is disposed around the striker shaft 26 within the housing 22. One end of the spring 78 is positioned against the outer striker head 52 and the other end of the spring is against the front cap 24. The spring 78 biases the striker assembly 40 inwardly of the housing 22. As best seen in FIG. 8, the inner diameter of the interior chamber 38 of the housing 22 is decreased intermediate the ends of the housing forming a seat 80 against which the inner striker head 54 is biased proximate to a front end of the driver assembly 42 (FIG. 5). The size of the coil spring 78 is selected so that the space between the inner striker head 54 and outer striker head 52 is maintained by the striker head spring 76.

Figure 14:
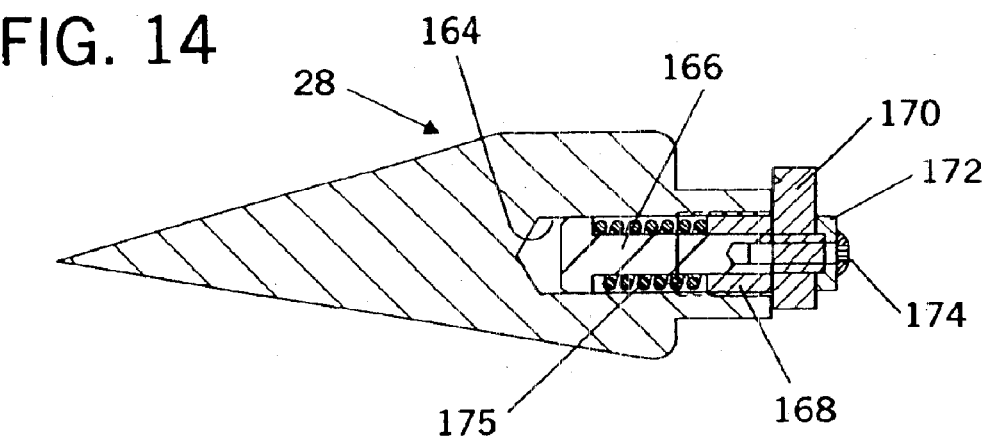
FIG. 14 is a side cross-section view of a removable shaft tip for use with the recoilless impact device shown in FIG. 1.
Figure 15:
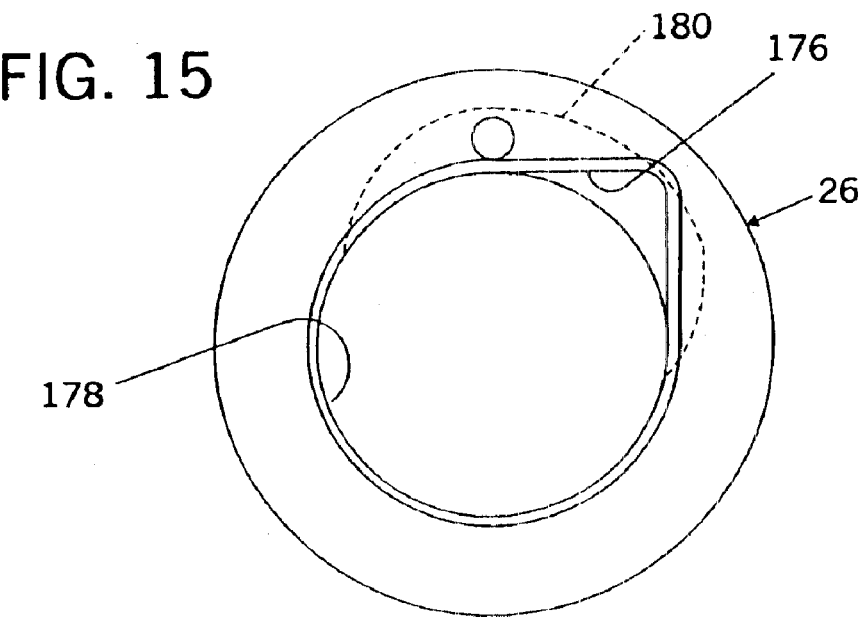
FIG. 15 an end view of a shaft for use with the recoilless impact device shown in FIG. 1.

Referring to FIG. 14, the removable tip 28 is shown in more detail. The tip 28 has an axial bore 164 for slidably receiving a pin 166 which is held in the tip 28 by a hollow, peripherally-threaded plug 168 which journals the end of the pin 166. A key retainer 170 is secured to the end of the pin 166 by a cap 172 and screw 174 which is received in an axial threaded bore in the end of the pin 166. A spring 175 is disposed around the pin 166 in the tip 28. One end of the spring 175 is against the pin 166 head and the other end of the spring is against the plug 168 to bias the pin 166 and attached key retainer 170 inwardly of the tip 28. The outer end of the striker shaft 26 is shown in FIG. 15 to include a blind channel 176 defined along an axial bore 178. A transverse slot 180 is formed at the inner end of the channel 176. To attach the tip 28 to the end of the striker shaft 26, the key retainer 170 is aligned with the channel 176 in the end of the shaft 26 and tip 28 pushed into the shaft along the depth of the channel. A counterclockwise turn (as seen in FIG. 15) of the tip 28 will cause the key retainer 170 to move along the slot 180 thus locking the tip 28 in place in the shaft 26. Removal of the tip 28 is the reverse of attachment.

Figure 9:
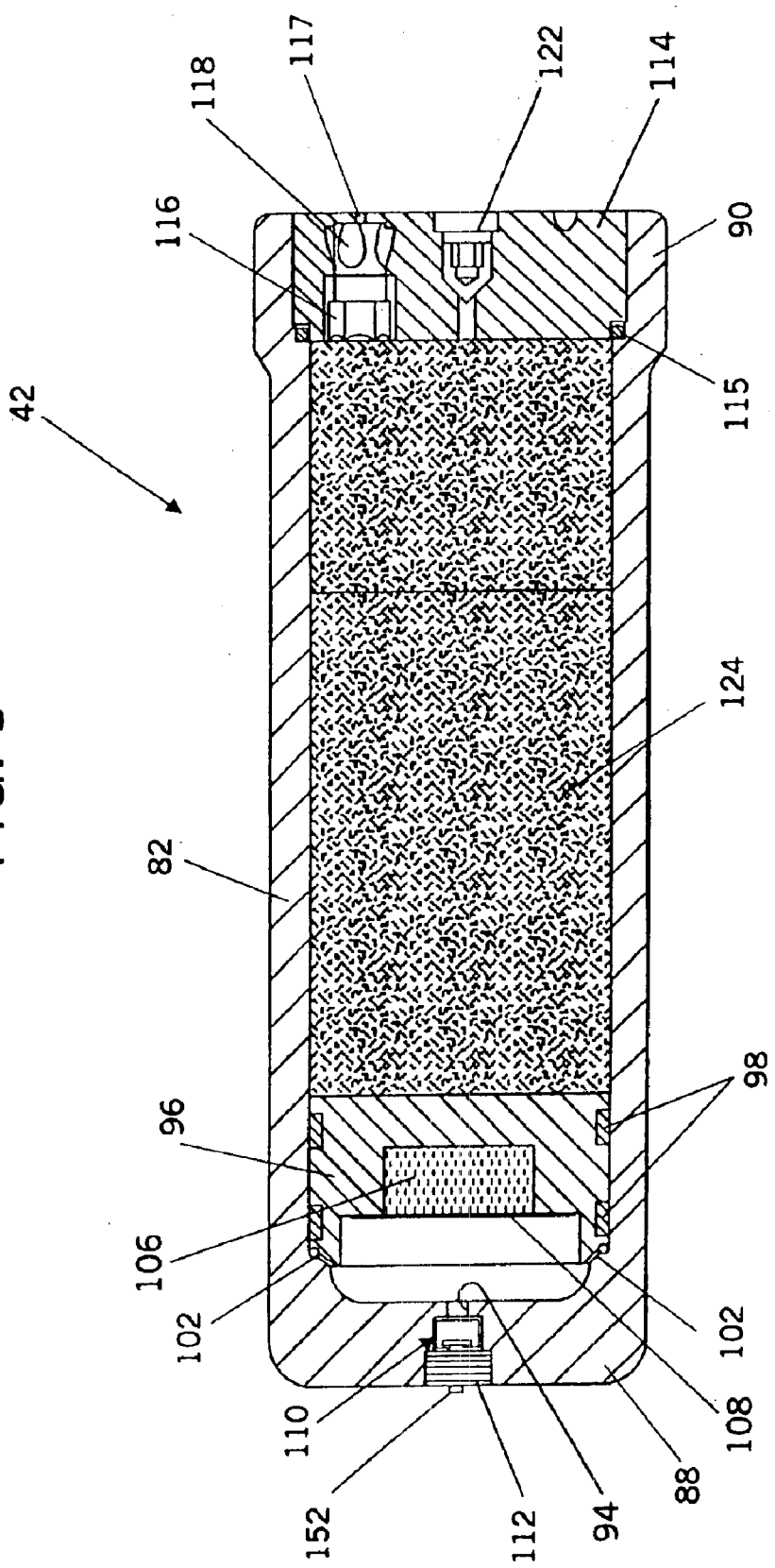
FIG. 9 is a longitudinal cross-section view of a driver assembly for use with the recoilless impact device of FIG. 1.
Figure 10:
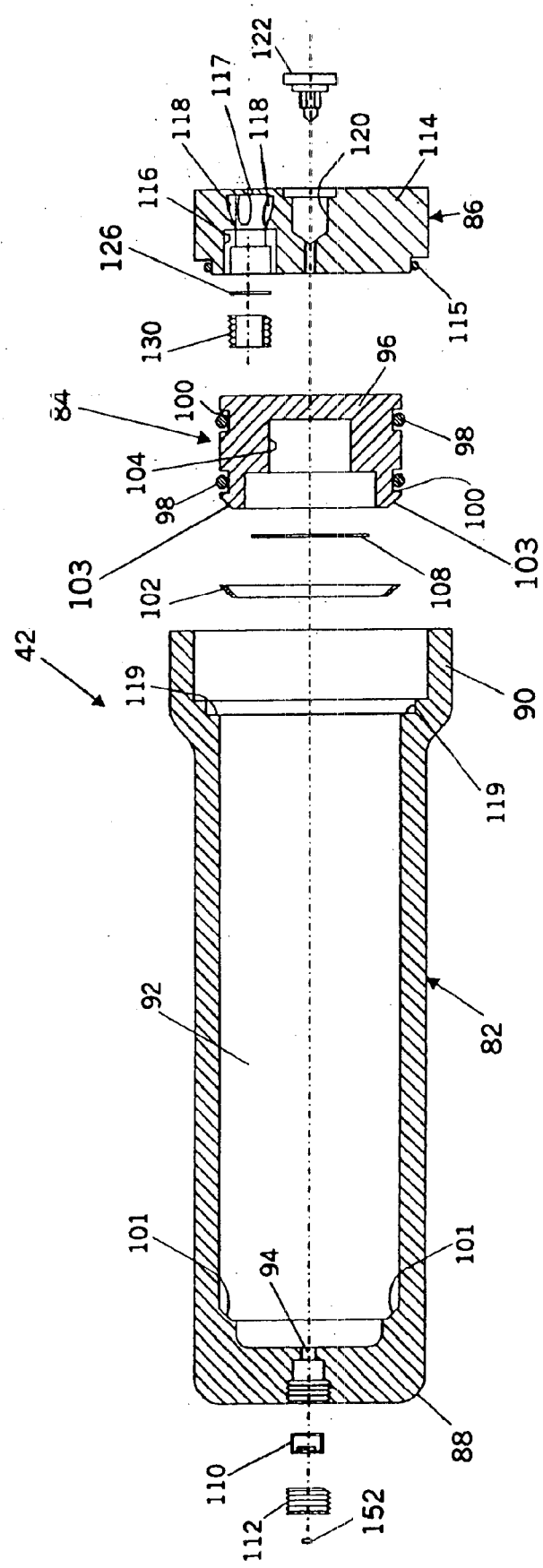
FIG. 10 is an exploded cross-section view of the driver assembly shown in FIG. 9.

The driver assembly 42 is shown in FIGS. 9 and 10. The driver assembly 42 is similar to the recoilless propulsion unit shown and described in U.S. Pat. No. 5,099,764, the contents of which are hereby incorporated by reference, which expels a pressurized fluid from the unit through a nozzle using a closed-breech piston activated by a propellant charge.

The driver assembly 42 according to the present invention comprises a generally cylindrical hollow tube 82, a piston assembly 84 and a nozzle assembly 86. The tube 82 has a closed inner end 88 and an open rear end 90 and defines an interior chamber 92. The closed end 88 of the tube 82 has an axial passage 94 of stepped diameter opening outwardly of the end of the tube. The open end 90 of the tube 82 is internally threaded and is slightly thicker, which strengthens this portion of the tube.

The piston assembly 84 includes a cup-shaped piston 96 slidably disposed in the interior chamber 92 adjacent the closed inner end 88 of the tube 82. The piston 96 may be nylon for most fluids, but is preferably metal when gas permeability of the fluid is a consideration. The outer surface of the metal piston 96 is sealed against the walls of the interior chamber 92 by two spaced o-rings 98 with metal backing rings which fit in spaced circumferential grooves 100 in the piston. The o-rings 98 also serve as a guide for movement of the piston 96 in the tube 82. Alternatively, the o-rings 98 and backing rings may be replaced by T-seals typically used in high-pressure dynamic sealing applications.

A frustoconical ring seal 102 fits between chamfered surfaces 101, 103 at the front of the end of the tube 82 and the piston 96. The piston 96 separates the interior chamber 92 of the tube 82 into front and rear variable volume chambers. The ring seal 102 prevents fluid, particular permeable gases, in the rear variable volume chamber from entering the front variable volume chamber. Preferably, the ring seal 102 comprises a polymer material, but could be a soft metal. Alternatively, the periphery of the front of the piston can be grooved and coated with a soft metal, such as copper or silver, for sealing the space between the piston 96 and tube 82. In any case, the pressure of the fluid in the chamber 92 forces the piston 96 forward thereby compressing the ring seal 102 against the chamfered surface at the inner end of the tube 82 for sealingly separating the front and rear variable volume portions of the tube chamber 92.

The piston 96 has a central recess 104 for retaining a propellant charge 106. It is understood that the present invention is not limited to the type of propellant used. For example, a suitable propellant is Winchester 231 smokeless powder. Adhesive paper 108 seals the propellant 106 in the recess 104 which centralizes the propellant in a contained target area. Although not shown in the FIGs., the rear portion of the piston 96 may include a protrusion of slightly less diameter than the body of the piston 96. As will be described below, when the impact device 20 is fired, the piston 96 is driven rearward with great force into the nozzle assembly 86. The protrusion on the rear portion of the piston 96 strengthens the surface of the piston 96 that impacts the nozzle assembly 86 thereby minimizing the potential for deformation of the piston 96 edges.

A primer 110 is disposed in the axial passage 94 in the closed end of the tube 82 and held in place by a threaded plug 112. Suitable primers 110 include M52A3B1 or PA520 military grade electrically-initiated primers available from Lake City (Ohio) Army Ammunition Plant. A small amount of electrical energy, approximately 1 mJ, will form an arc within these primers which ignites a very small amount of propellant. The passage 94 serves to communicate the primer 110 with the propellant charge 106 in the piston 96 and directs gases from the primer into the front variable volume chamber.

Figure 16:
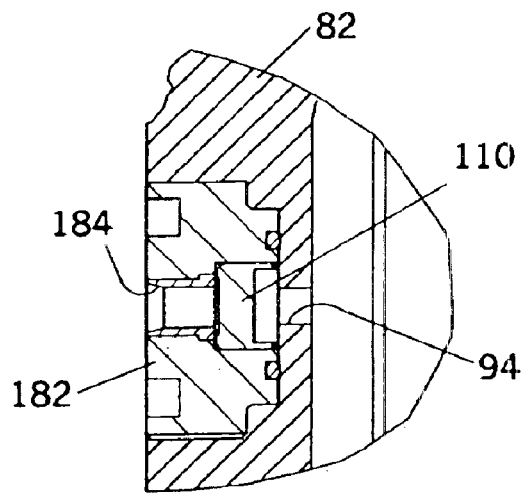
FIG. 16 is a close-up side cross-section view of a primer and primer block for use with the driver assembly shown in FIG. 9.

Another embodiment of the driver assembly 42 according to the present invention is shown in FIG. 16. In this embodiment, the primer 110 is disposed in a peripherally threaded cylindrical primer block 182 which is received in a larger diameter portion of the opening 94 in the inner end of the tube 82. The primer 110 fits in an opening in the primer block and is held in place by a hollow, peripherally threaded retainer 184. The retainer 184 defines an opening 186 in the primer block 186 that allows access to the inner end of the primer 110. The large diameter primer block 182 provides a contact point for completing an electrical firing circuit as will be described below.

The nozzle assembly 86 includes a peripherally-threaded cylindrical nozzle 114 which is threaded into the open end of the tube 82. An o-ring 115 seals the inner surface of the nozzle 114 against a shoulder 119 in the open end of the tube 82. When $CO_2$ is the fluid, the o-ring is preferably polyurethane which is less susceptible to gas permeability. The inner surface of the nozzle 114 has a plurality of blind bores 116 (FIGS. 11A–11D) of stepped diameter. A small vent hole 117 leads from the end of each bore 116 outwardly of the nozzle 114. A plurality of angled passages 118 branch from a point intermediate along the length of the bores 116 and open outwardly of the outer surface of the nozzle 114 forming elliptical openings in the bores and the outer surface of the nozzle. The hole pattern formed by the passage 118 openings in the outer surface of the nozzle 114 is selected so as to disperse the fluid in as many jets as possible without adversely affecting the flow characteristics of the fluid and to optimize the safety of the exit area of the nozzle 114. The greater the exit area the more optimal the propulsion of the impact device 20. FIG. 3 shows another multiple hole pattern in the outer surface of the nozzle 114. This pattern results from seven spaced bores 116 and four angled passages 118 from each bore 116. The thickness of the nozzle 114 is determined by the structural integrity of the hole pattern and the flow characteristics of the fluid 18 through the passages 118.

Fluid 124 contained within the second variable volume chamber is preferably a liquid and, more preferably, the fluid is liquid $CO_2$. Liquid $CO_2$ is stored in the tube 82 as a high pressure liquid/gas mixture wherein liquid $CO_2$ fills from about 50% to about 95% of the volume of the chamber 92. At $CO_2$ liquid levels below about 50% there is typically not enough power delivered for propelling the driver assembly 42 forward with sufficient force when the device 20 is fired. $CO_2$ liquid levels above 95% become too volatile since the $CO_2$ pressure will change due to temperature. Thus, the upper limit to the liquid level is determined based on an expected storage temperature range. A preferred $CO_2$ liquid level is about 75% at which the interior chamber 92 pressure will range from about 600 psi at 0° F. to about 3000 psi at 145° F. It is understood that other fluids may be used which have different preferred fill levels. For example, if water is the chosen fluid, the water preferably fills substantially 100% of the volume of the second variable volume chamber of the tube 82.

Figure 11A:
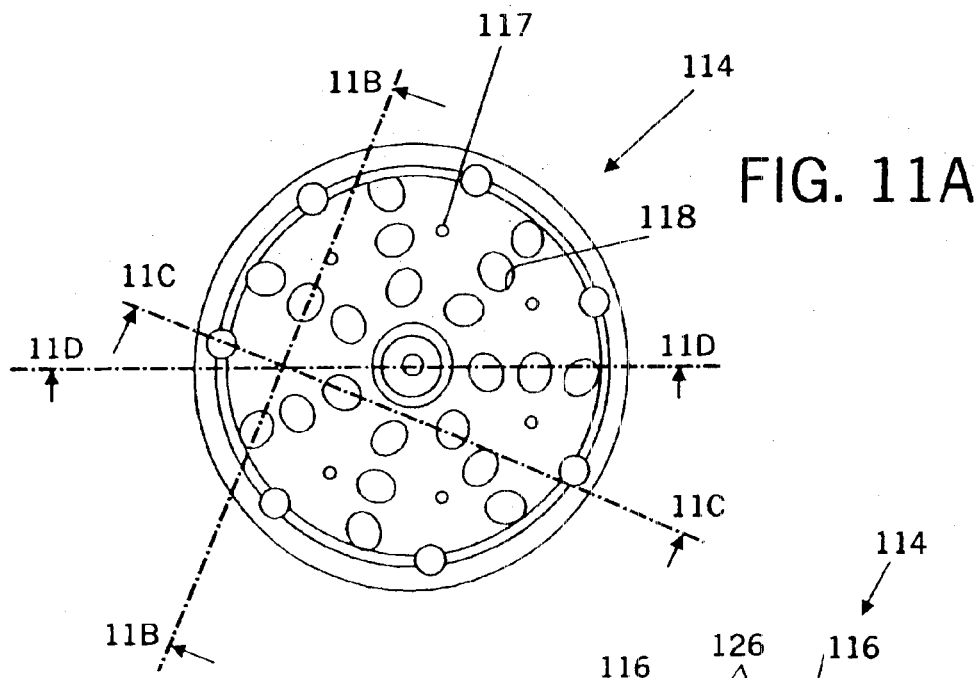
FIG. 11A is a flat plan view of a nozzle for use with the recoilless impact device shown in FIG. 1.
Figure 11B:
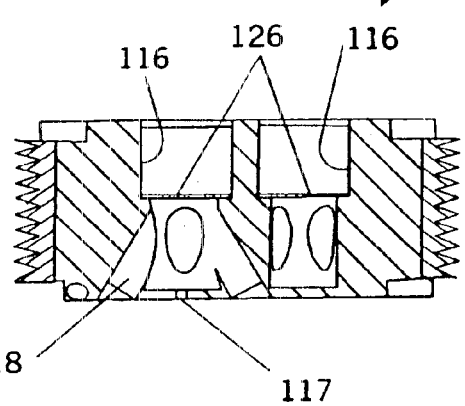
FIGS. 11B-11D are cross-sectional views of the nozzle shown in FIG. 11A taken along lines 11A-11A, 11B-11B, and 11C-11C, respectively.
Figure 11C:
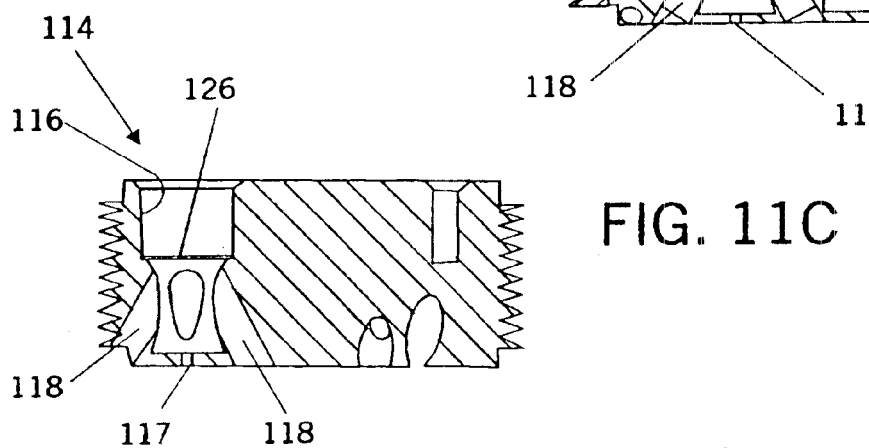
Figure 11D:
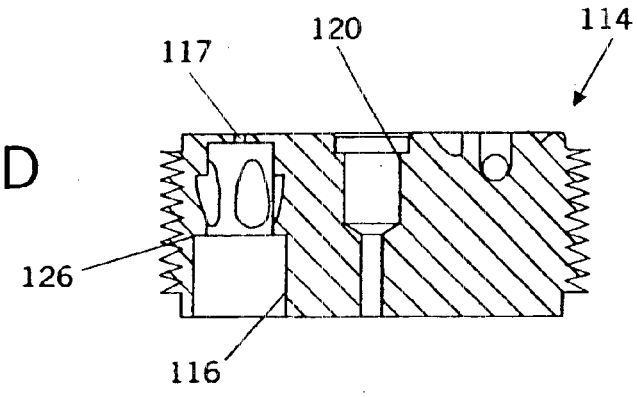

A brass burst disc 126 is disposed in each bore 114 against the shoulder 128 formed where the bore changes diameter (FIG. 11C). The burst disc 126 is formed from a brass shim stock with a protective coating. Each burst disc 126 is sealed in place with a hollow hex head retainer screw 130 for sealing the interior chamber 92 of the tube 82. When liquid $CO_2$ is used as the fluid in the driver assembly 42, the burst disc is designed to withstand 3700 psi.

Figure 17:
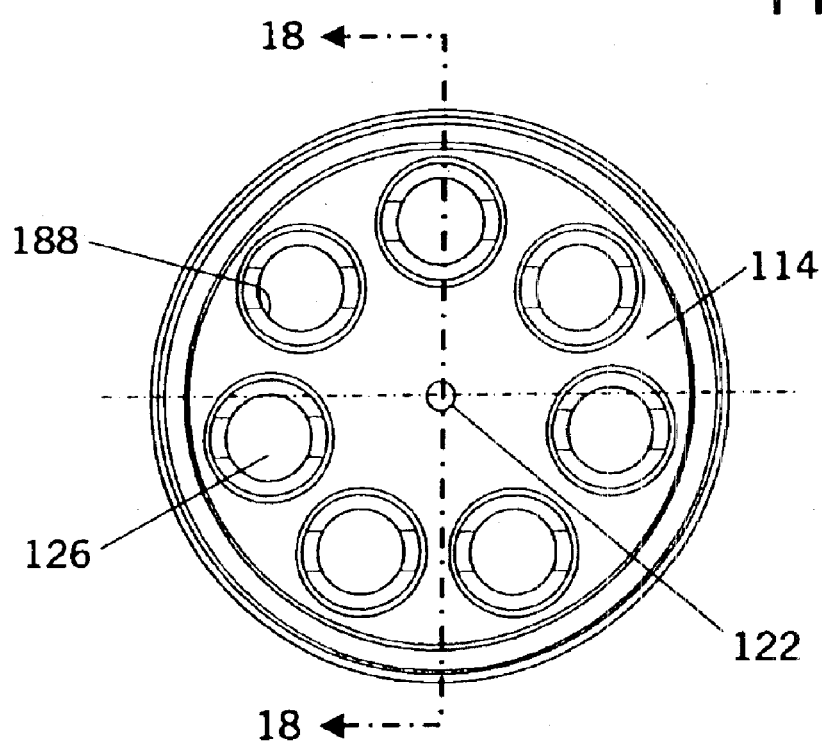
FIG. 17 is a flat plan view of another embodiment of a nozzle for use with the recoilless impact device shown in FIG. 1.
Figure 18:
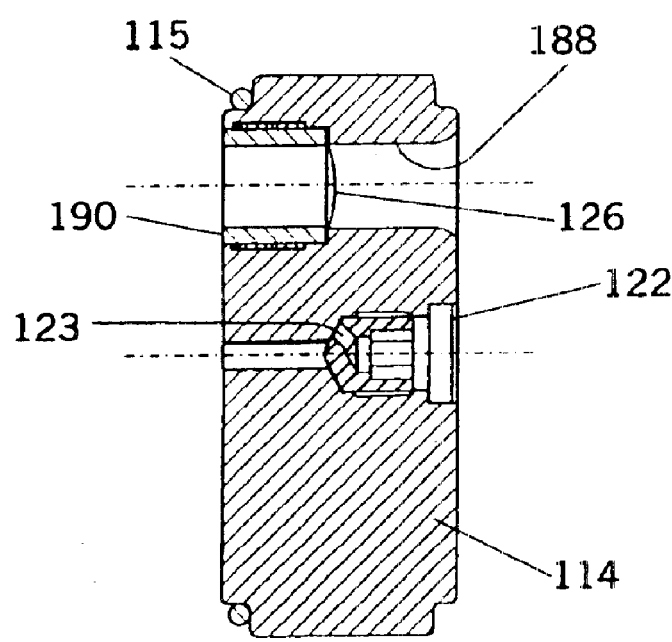
FIG. 18 is a cross-sectional view of the nozzle shown in FIG. 17 taken along line 17—17.

A simplified nozzle 114 design according to the present invention is shown in FIGS. 17 and 18. This nozzle 114 has seven straight passages 188 for fluid ejection. Each passage 188 is sealed by a burst disc 126 held in place by a peripherally threaded cylindrical retainer sleeve 190. This nozzle 114 design is possible with the use of stainless steel non-fragmenting burst discs 126 available from BS&B Safety System of Tulsa, Okla.

As best seen in FIG. 18, the nozzle 114 also has a central fill hole 120 which opens into the interior chamber 92 of the tube 82. A threaded plug 122 is provided for sealing the fill hole 120. The plug 122 is a hollow modified set screw with an opening 123 that feeds into the interior 92 of the tube 82 when the plug 122 is slightly backed out of the hole 120. An appropriate adapter (not shown) is provided on the plug 122 for coupling to a fluid feed line for loading the second variable volume portion of the interior chamber 92 of the tube 82 between the piston 96 and the nozzle 114.

Figure 12:
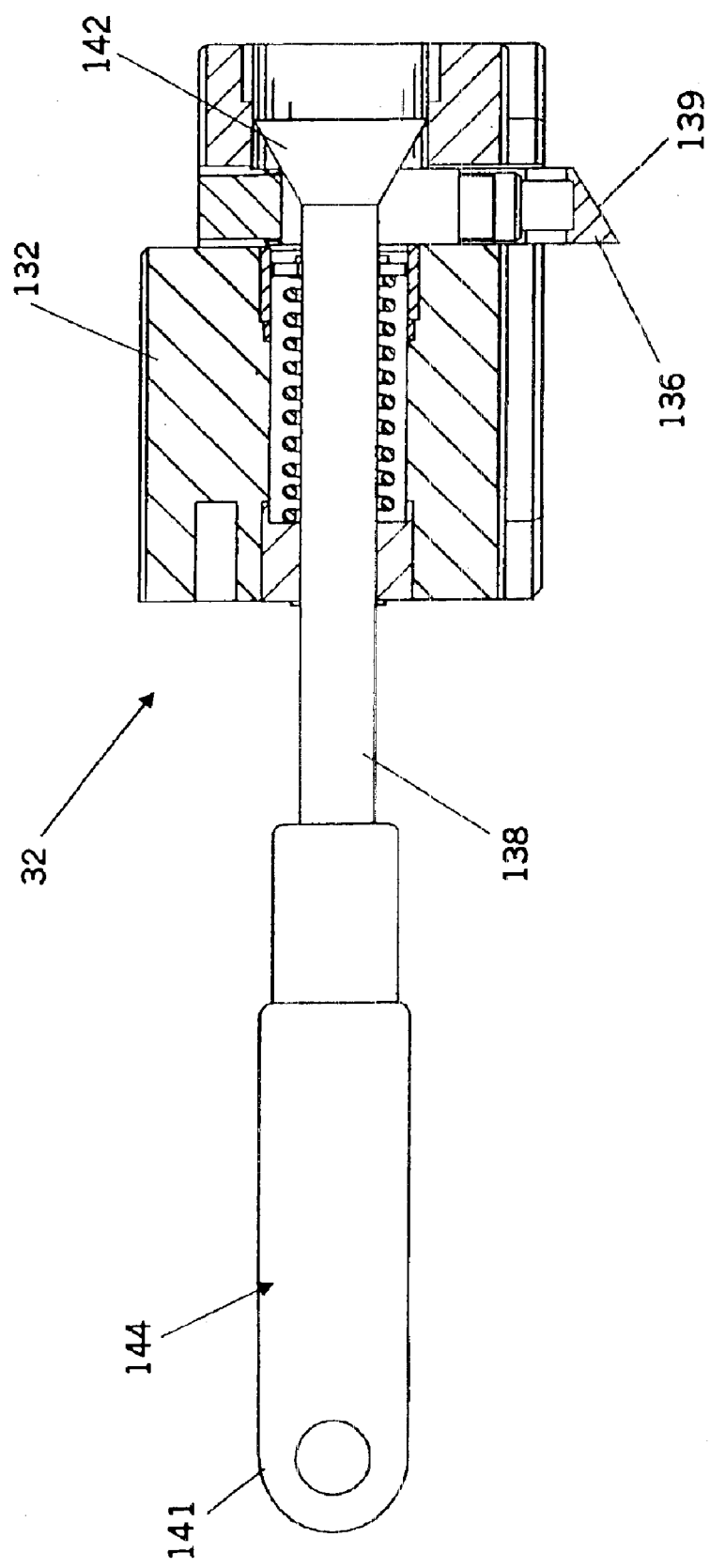
FIG. 12 is a side elevation view of a key block assembly for use with the recoilless impact device shown in FIG. 1.

Means for retaining the driver assembly 42 in the housing 22 are provided. The driver assembly retention means comprises the key block assembly 32 mounted on the rear of the housing 22. As best shown in FIG. 12, the key block assembly 32 includes a block 132, a stop hammer 136 and a plunger 138 reciprocally disposed in the channel weldment 30. The stop hammer 136 is a flat piece having an opening 137 therethrough which is reciprocally received in a slot in the block 132. The key block assembly 132 is positioned over a peripheral slot 140 in the housing 22 (FIG. 5) which opens through to the interior chamber and allows the stop hammer 136 to extend into the housing 22. The plunger 138 has a forward end 141 and a conically-shaped rear end 142 and is slidably disposed in the block 132. The plunger 138 passes through the opening 137 in the stop hammer 136. Movement of the plunger 138 in the key block assembly 32 relative to the stop hammer 136 moves the stop hammer 136 between a first position where a portion of the stop hammer extends into the housing 22 and a second position where the stop hammer is out of the housing. In the first position, the stop hammer 136 extends through the slot 140 in the housing and engages the rear of the tube 82 for securing the driver assembly 42 in the housing 22. In the second position, the stop hammer 136 is in a non-blocking position with respect to the tube 82 so that the driver assembly 42 may be removed from the housing 22. The stop hammer 136 is biased into the first, blocking position by one or more springs in the block 132. A yoke 144 is shown connected to the front end of the plunger 138 for attachment to an appropriate release mechanism operable by the user.

In keeping with the present invention a firing mechanism is provided. It is understood that there are many ways to fire the primer 110, including mechanical and electrical means.

Preferably, the firing mechanism is electrical since electrical means are less prone to accidental actuation. The specifics of the electrical circuitry for firing the device 20 can be easily developed by those skilled in the art and will not be addressed. A preferred approach for carrying an electrical charge from a power source through the housing 22 and to the driver assembly 42 will be described. This approach includes first and second electrical contact plungers 146, 148 schematically shown in FIG. 5. The plungers 146, 148 are spring-biased through respective openings in the housing 22 to a position adjacent the striker head 44. The first plunger 146 is biased into an open area in the housing 22 between the outer striker head 52 and inner striker head 54 when the impact device 20 is in a non-firing condition. An electrical wire 150 (not shown) connected to the copper contact ring 66 passes through a transverse hole (not shown) in the outer strike head 52 and into the axial opening in the striker head 44. The wire leads to an electrical plunger 152 (FIG. 9) disposed on the inner end of the driver assembly 42 and contacting the primer 110 for delivering electric current for firing the primer 110. The ground connection is through the primer 110 skirt which is in close contact with the primer plug 112. A plurality of electrical contact plungers 200, two of which are shown in FIG. 8, nested in the rear end of the inner striker head 54 contact the primer plug 112. The second plunger 148 is biased through the housing 22 and connects the inner striker head 54 to the electrical power source when the striker assembly 40 is in the firing position.

When preparing to fire the device 20, the housing 22 is loaded with a driver assembly 42 through the open end of the housing. The inside diameter of the housing 22 is larger than the closed end of the tube 82 to facilitate loading. The closed end of the driver assembly 42 engages the stop hammer 136 which has a ramped surface 139 for allowing the advancing driver assembly 42 to force the stop hammer up into the block 132. This movement is possible because the hole 137 in the stop hammer 136 is larger than the diameter of the plunger 138. The driver assembly 42 is advanced until the rear of the tube 82 is clear of the stop hammer 136 which is biased into the housing to hold the driver assembly 42 in the housing 22.

Figure 6:
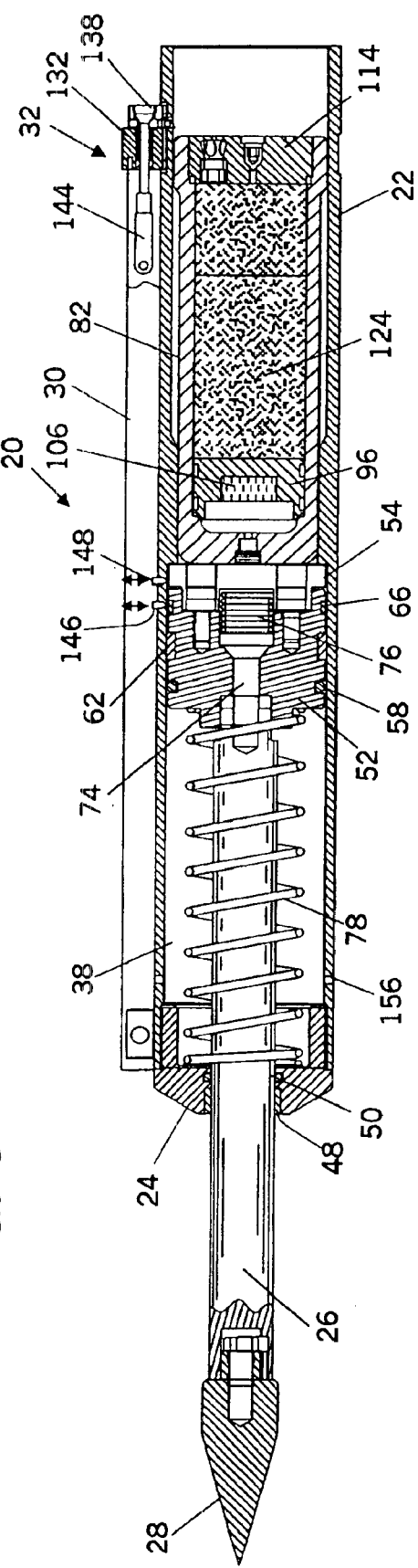
FIG. 6 is a side cross-section view of the recoilless impact device as shown in FIG. 5 with the striker assembly forced together.

Referring now to FIG. 6, the tip 28 of the striker shaft 26 is then positioned against an object such as a locked door, damaged structure or other barrier to be opened and manual force applied to the device 20 toward the object. This moves the striker shaft 26 inwardly of the housing 22 pushing the outer striker head 52 against the inner striker head 54 against the force of the interposed spring 76. When the outer striker head 52 is moved rearward, the first electrical contact plunger 146 engages the copper contact ring 66 on the outer striker head to complete the electrical circuit. Thus, the preferred firing mechanism requires the user to physically engage the target object with the striker shaft tip 28 and manually force the striker shaft 26 into the housing a predetermined distance to enable the firing mechanism. This is a safe arrangement which prevents accidental "dry" firing of the device 20.

Figure 19:
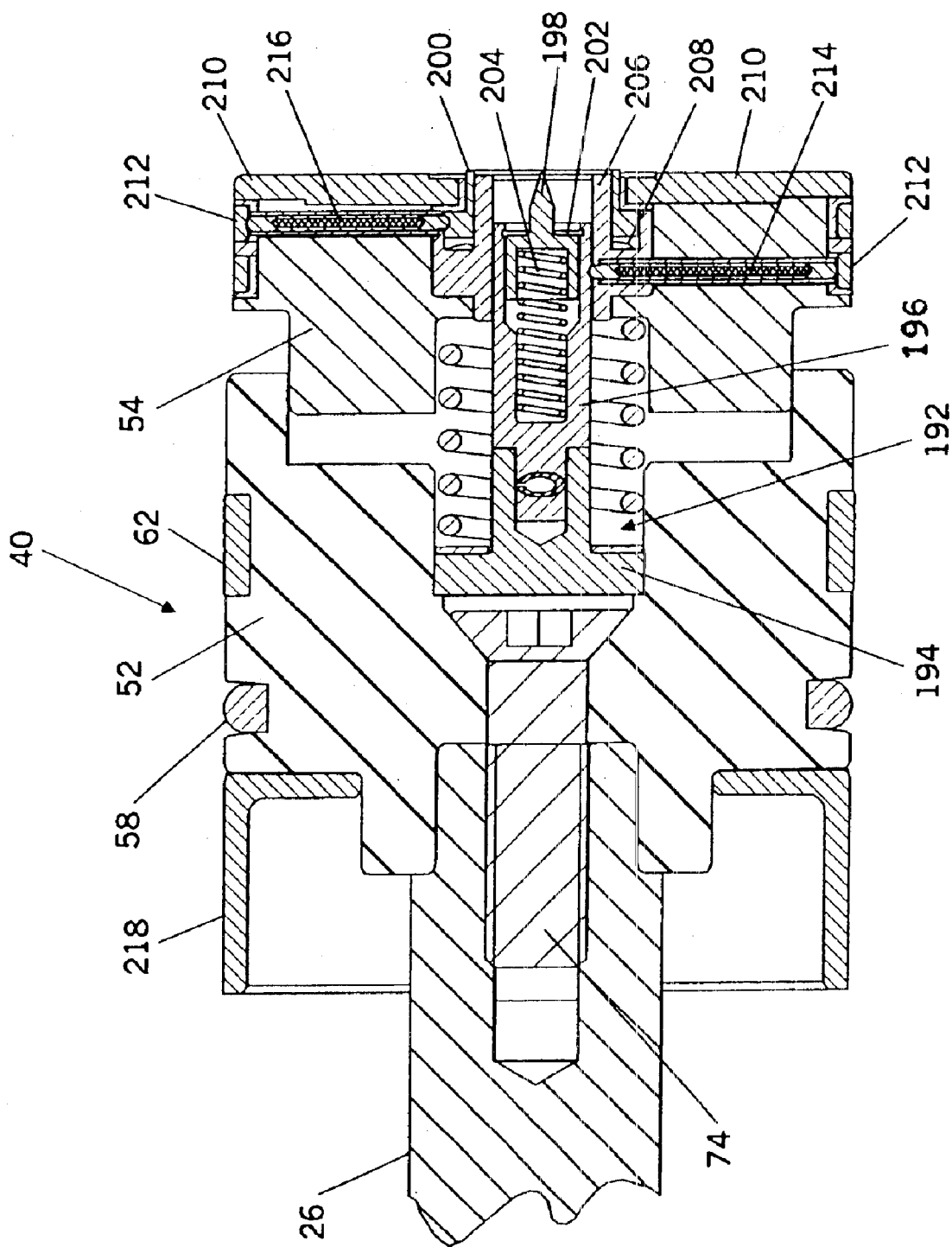
FIG. 19 is another embodiment of a striker assembly for use with the recoilless impact device shown in FIG. 1.

Another embodiment of the striker head 44 according to the present invention is shown in FIG. 19. In this arrangement, the outer striker head 52 and inner striker head 54 fit slidably together. A contact assembly 192 is positioned in axial openings across the striker heads 52, 54 for movement with the outer striker head 52 relative to the inner striker head 54. The contact assembly 192 comprises a nylon contact holder 194, a housing 196, a probe contact 198 and a ground contact 200. The contact holder 194 is fixed to a reduced inner end of the housing 196 which is formed from an electrically conductive material such as, for example, brass. The housing 196 has an axial bore which receives the electrically conductive probe contact 198. The probe contact 198 is held in the housing 196 by a retaining ring 202. A spring 204 is disposed in the housing 196 for biasing the probe contact 198 outwardly of the housing 196. The housing 196 is slidably received in an insulator sleeve 206 positioned in the inner striker head 54. The insulator sleeve 206 separates the ground contact 200 from the housing 196. A wave spring 208 is disposed between the ground contact 200 and the inner striker head 54 for biasing the ground contact outwardly of the housing 196 and against the primer block 182. A circular retainer disc 210 is fixed to the rear end of the inner striker head 54 to hold the contact assembly 192 elements in the inner striker head 54.

In this embodiment of the striker assembly 40, the periphery of the inner striker head 54 includes two peripheral grooves which hold electrically conductive contact rings 212. The spring-loaded contact pins 146, 148 are positioned in the housing 22 to engage the rings 212 in the both the non-firing condition and the firing position of the impact device 20. Spring-biased contact pin assemblies 214, 216 disposed in transverse passages in the inner striker head 54 electrically connect the contact bands 212 with the housing 196 and ground contact 200, respectively. This provides the electrical path from the exterior of the housing 22 to the probe contact 198 and ground contact 200. When the inner and outer striker heads 52, 54 are brought together in the firing position of the impact device 20, the probe contact 198 is extended from the rear end of the inner striker head 54 and engages the primer 110. Since the ground contact 200 is against the primer block 182 the firing circuit is completed.

In either embodiment of the striker assembly 40, a cup 218 may be secured to the front end of the outer striker head 52. The cup 218 serves as a witness panel for a proximity sensor (not shown) positioned in the outer cylinder of the housing. The proximity sensor senses when the inner and outer heads 52, 54 of the striker assembly 40 are compressed in the firing position of the impact device 20. This is a redundant arming feature. When the impact device 20 is in firing position, the operator fires the device 20 by actuating the firing mechanism which delivers an electrical charge to the primer 110. The primer cap 110 is discharged by the electrical charge. When the primer 110 fires, hot flame and gases generated by the primer pass into the first variable volume chamber through the passage 94 in the end of the tube 82. The gases are directed by the passage 94 at a target area on the paper 108 retaining the propellant 106. The primer gases penetrate the paper 108 and ignite the propellant 106 while simultaneously blowing the propellant around the first variable volume chamber.

Expansion of the propellant gases builds up pressure in the first variable volume chamber between the piston 96 and the front end of the tube 82. The pressure increase generates a force on the piston 96 which is transferred to the fluid 124. The propellant gases continue to expand causing fluid pressure to rise until the burst discs 126 are ruptured. In the embodiment of the nozzle assembly 86 employing fragmenting burst discs 126, the vent holes 117 allow pieces of the burst discs 126 to be driven safely into the blind end of the nozzle bores 116. The vent holes 117 are too small to let pieces of the discs 126 escape. Alternatively, spikes (not shown) extending from the blind end of the bores 116 for capturing the burst discs 126 could replace the vent holes 117. The inner elliptical openings of the secondary nozzle passages 118 are small enough to prevent pieces of the burst disc from exiting the nozzle 114.

Figure 7:
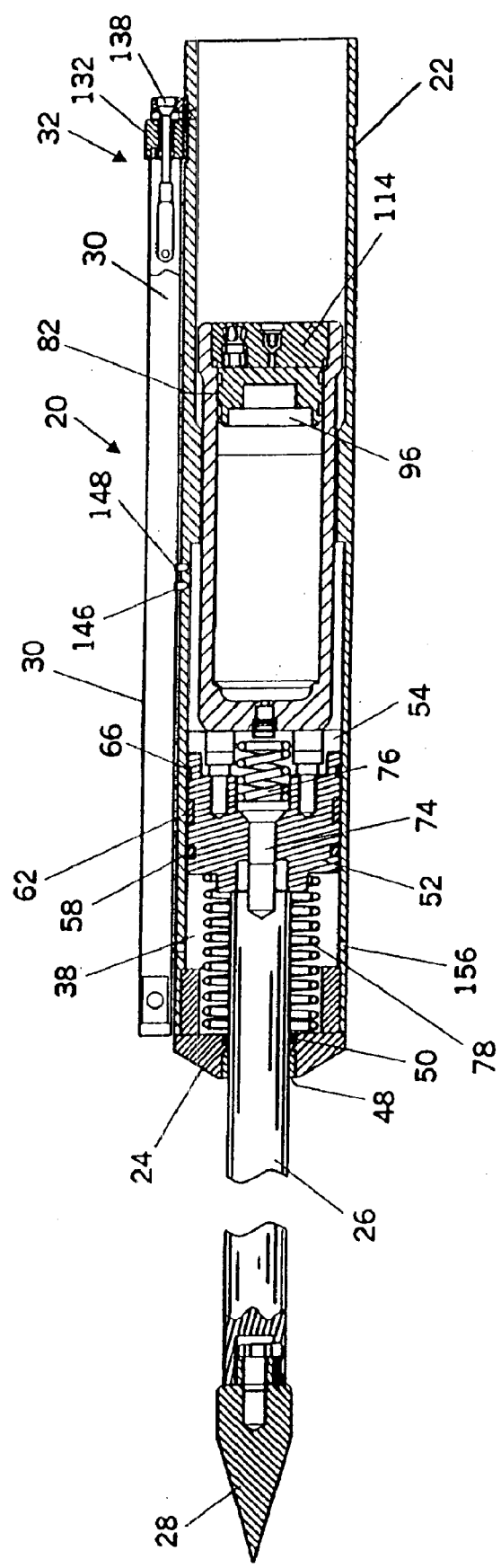
FIG. 7 is a side cross-section view of the recoilless impact device shown in FIG. 6 after firing of the device.

The propellant gases continue to expand causing fluid 124 to be expelled through the nozzle 114 and into the atmosphere away from the user. Referring to FIG. 7, the momentum and the pressure generated by the fluid 124 expelled into the atmosphere force the driver assembly 42 forward against the striker head 44 which moves the striker assembly 40 towards the front end of the housing 22 with great force. The striker shaft tip 28 impacts against the locked door, damaged structure or other barrier so that the user, such as law enforcement or emergency personnel, may gain access to the building or structure. The recoilless feature of the device 20 is due to the Davis Gun Principle which holds that when a mass is expelled from a body there is an equal and opposite reaction generated propelling that body. In the present invention, the expelled fluid 124 generates a driving force. Since this reaction takes place within the housing 22 which is not rigidly attached to the propelling body, the result is no recoil transferred to the housing.

Ideally, the burning propellant generates a pressure in the first variable volume chamber acting on the piston which, after an initial increase, is relatively constant over time as the piston travels toward the nozzle. Eliminating an initial pressure spike when the propellant is ignited allows a less robust tube to be manufactured. This goal is realized in the present invention due to a number of factors related to interior ballistics principals for pyrotechnically driven devices. First, the ratio of propellant charge to the initial available volume of the first variable volume chamber contributes to the desired propellant ignition and initial burn cycle. Maintaining the proper ratio controls the explosive nature of the burning propellant and the rate of the initial pressure increase upon firing of the device. Too much propellant or too little volume can lead to too high of an initial pressure spike. The cup shape of the piston is also a factor in the chamber configuration to optimize the burning of the propellant. The initial location of the piston 96 sets the chamber volume which matches an optimum burning solution for the propellant. The position of the recess 104 and the retaining paper 108 fixes the propellant conditions and minimizes the initial area exposed to the primer flame and gases for slowing the initial propellant burning rate. Blowing the propellant around the chamber helps produce a consistent repeatable burn.

The pressure in the first variable volume chamber increases until the burst discs 126 rupture and fluid 124 is expelled from the nozzle. The burst discs 126 are designed to burst at a predetermined pressure in order to insure proper propellant burn pressure and temperature. As the piston 96 moves down the tube 82, the first chamber volume ahead of the piston 96 increases proportionally to the amount of fluid 124 displaced. This increase in the first chamber volume directly affects the burning characteristics of the propellant charge 106. The rate at which fluid 124 is expelled from the tube 82 is directly proportional to the number and total cross-sectional area of holes 118 in the nozzle 114 which determine the amount of resistant force, or back pressure, acting on the piston 96 as the piston moves down the tube and causes propellant to burn to a relatively steady rate. Thus, with a known initial volume of the first variable volume chamber and a specific nozzle design, a propellant charge 106 can be selected by those skilled in the art so as to generate a controlled propellant burn cycle and provide a desired pressure curve for the system.

In a preferred embodiment, the propellant charge is 4.1 g which occupies about 0.1496 cubic inches. The empty volume of the first variable volume chamber is about 1.988 cubic inches. Thus, the ratio of the propellant charge to the initial chamber volume is 0.075. The driver assembly 42 is loaded with approximately 0.42 lbs. of liquid $CO_2$. The burst discs retain at least an additional 1000–1200 psi of pressure before the discs break to properly initiate propellant burning. This configuration produces about 7000 psi of pressure within the propellant chamber and produces relatively constant pressure over time during firing. The impact force of the device 20 having these characteristics is designed to be 65,000 lbs. of peak force at 20 lb-sec impulse at ambient temperatures against a rigid surface. The liquid $CO_2$ turns into solid flakes, like snow, as it passes through the nozzle 114. The driver assembly 42 is recessed into the housing 22 to create a cavity for the expanding $CO_2$ liquid-to-gas effect to increase impulse from the pressure generated by the phase change of the fluid.

The striker assembly 40 compresses the spring 78 between the striker head 44 and front cap 24 as the striker shaft 26 extends from the housing 22. The spring 78 and air compressed between the front cap 24 and striker head 44 serve as a pneumatic damping mechanism for slowing the striker assembly 40 to a stop and minimizing forward recoil. A small vent hole 156 is provided in the housing 22 near the front end. Air is forced through the vent hole 156 only if pressure in the housing reaches a predetermined pressure, for example about 250 psi, which happens only if the striker is over-accelerated. This feature is particularly advantageous when the device 20 is dry-fired or a target object is easily penetrated when fired. The tube 82 is slightly tapered at the nozzle end 90 to allow propellant gases to vent between the piston assembly 84 and the tube wall to relieve the pressure in the driver assembly 42 as the piston 96 is nearing the nozzle 114. The compression spring 78 returning the striker assembly 40 and driver assembly 42 into the housing to the pre-firing position shown in FIG. 5.

After firing, the device is reloaded by advancing the plunger 138 which raises the stop hammer 136 away from the rear of the driver assembly 42. The spent driver assembly 42 is slipped out of the housing 22 and replaced with a fresh driver assembly. The spent driver assembly is reusable.

Figure 13:
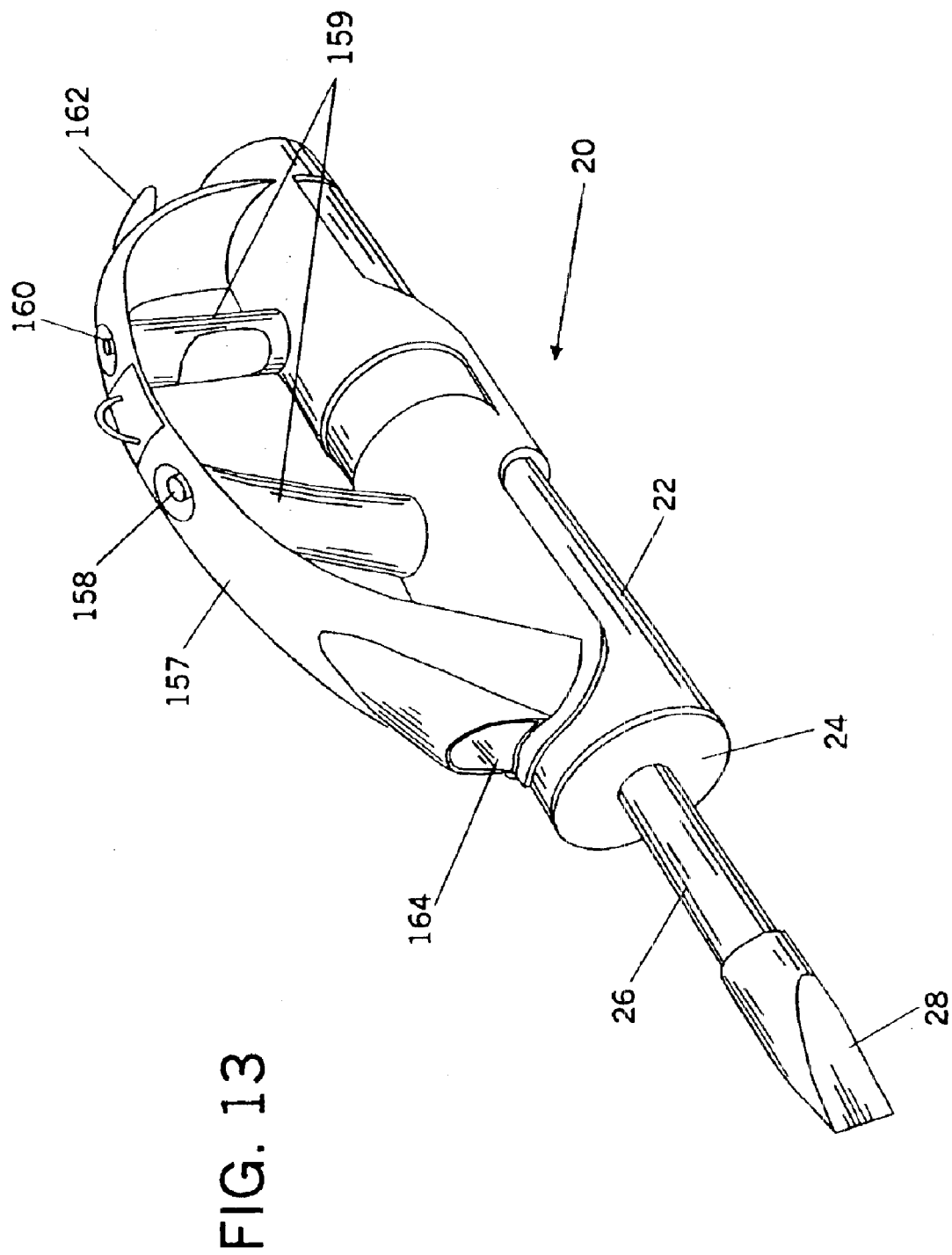
FIG. 13 is an embodiment of the recoilless impact device as shown in FIG. 1 including a handle assembly.

An embodiment of the device 20 including a handle assembly 157 is shown in FIG. 13. The handle assembly 157 is preferably formed from a fiber reinforced composite material which is both strong and light, and comprises two hand grips 159 extending transversely to the housing 22. The handle assembly 157 accommodates a power source, such as a 9-volt battery. When the user holds the device 20, the user's thumbs are over a forward safety button 158 and a rear firing switch 160 positioned on the outside of the device which is easily accessible to the user holding the device. In a preferred firing sequence, when the user pre-loads the device 20 by pressing the tip 28 against a rigid object, an LED under the safety button 158 lights signaling the user the device is pre-loaded. The user then presses the safety button 158 which powers up the device 20. When the device 20 has enough energy to fire, an LED under the firing switch 160 lights and the user knows the device is ready to fire.

A pivoting release lever 162 on the rear of the handle assembly 157 is pressed downward to raise the stop hammer 136 and allow a spent driver assembly to be removed and replaced.

The previously described versions of the present invention have many advantages, including delivery of a large impact to a target object, such as a locked or damaged structure, while generating no recoil, even when impacting soft target objects or accidental dry firing. The device is a great improvement over existing forcible entry devices for gaining entry to locked or damages structures through doors or other barriers. The impact device of the present invention is also compact and lightweight. This reduces the amount of time required to gain access to the building or damaged structure. Further, the impact device is versatile enough to be utilized in the many different situations in addition to those noted above, including for forcibly cutting materials and the dispatching of animals to be processed for nutritional purposes.

Although the present invention has been shown and described in considerable detail with respect to only a few exemplary embodiments thereof, it should be understood by those skilled in the art that we do not intend to limit the invention to the embodiments since various modifications, omissions and additions may be made to the disclosed embodiments without materially departing from the novel teachings and advantages of the invention, particularly in light of the foregoing teachings. For example, the impact device of the present invention has numerous other applications including delivering destructive blows to objects or dispatching animals. The significant advantage of the device is the forceful impact delivered with no recoil. Accordingly, we intend to cover all such modifications, omissions, additions and equivalents as may be included within the spirit and scope of the invention as defined by the following claims. In the claims, means-plus-function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a crew may be equivalent structures.

We claim:

1. A firing system for an impact generating apparatus including a housing defining an interior chamber with a front portion and a rear portion, the firing system comprising:

a striker assembly having a first end and a second end and movably disposed within the front portion of the housing, the striker assembly comprising, a striker head disposed at the first end of the striker assembly, the striker head having inner and outer portions which are moveable relative to one another and the inner portion of the striker head having an opening, a spring interposed between the inner and outer portions of the striker head for biasing apart the portions of the striker head to a spaced position, and a striker shaft mounted to the outer portion of the striker head and extending outwardly of the front portion of the housing and terminating in the second end of the striker assembly;

a driver assembly having a first end and a second end and containing a propellant charge, the driver assembly disposed within the rear portion of the housing so that the first end of the driver assembly is adjacent the inner portion of the striker head;

means responsive to an electrical charge for igniting the propellant, the propellant igniting means disposed on the first end of the driver assembly;

an electrical power supply associated with the housing; and a firing circuit comprising, electrical contacts connected to the power supply and adapted to be positioned in the housing adjacent the inner portion of the striker head, positive and negative electrically conductive rings disposed around the inner portion of the striker head and operatively connected to the electrical contacts in the housing, an electrically conductive contact member including a positive contact and a negative contact, the contact member disposed within the striker head for movement with the outer portion of the striker head and relative to the inner portion of the striker head from a first position where the inner and outer portions of the striker head are spaced and at least one of the positive contact or negative contact is within the opening in the inner portion of the striker head and a second position where the inner and outer portions of the striker head are closer together and the one of the positive contact or negative contact extends from the inner portion of the striker head toward the rear portion of the housing, and means for electrically connecting the positive and negative conductive rings with the positive and negative contacts, respectively, on the contact member, wherein when a target object is forcibly engaged with the striker shaft tip so as to move the striker shaft inwardly of the housing, the outer portion of the striker head is moved toward the rear portion of the housing relative to the inner portion of the striker head to the second position so that the one of the positive contact or negative contact of the contact member extends from the inner portion of the striker head to engage the propellant igniting means for completing an electrical firing circuit to enable firing of the device by electrical power supplied through the firing circuit to the propellant igniting means, and wherein a spring is disposed around the striker shaft and is adapted to be positioned between the front portion of the housing and the outer portion of the striker head for biasing the striker head towards the rear portion of the housing, the sizes of the spring disposed around the striker shaft and the spring that is interposed between the inner and outer portions of the striker head being such that the spring that is interposed between the inner and outer portions of the striker head can bias the inner and outer portions of the striker head to the spaced first position.

2. A firing system for an impact generating apparatus including a housing defining an interior chamber with a front portion and a rear portion, the firing system comprising:

a striker assembly having a first end and a second end and movably disposed within the front portion of the housing, the striker assembly comprising, a striker head disposed at the first end of the striker assembly, the striker head having inner and outer portions which are moveable relative to one another and the inner portion of the striker head having an opening, and a striker shaft mounted to the outer portion of the striker head and extending outwardly of the front portion of the housing and terminating in the second end of the striker assembly;

a driver assembly having a first end and a second end and containing a propellant charge, the driver assembly disposed within the rear portion of the housing so that the first end of the driver assembly is adjacent the inner portion of the striker head;

means responsive to an electrical charge for igniting the propellant, the propellant igniting means disposed on the first end of the driver assembly;

an electrical power supply associated with the housing; and a firing circuit comprising, electrical contacts connected to the power supply and adapted to be positioned in the housing adjacent the inner portion of the striker head, positive and negative electrically conductive rings disposed around the inner portion of the striker head and operatively connected to the electrical contacts in the housing, an electrically conductive contact member including a positive contact and a negative contact, the contact member disposed within the striker head for movement with the outer portion of the striker head and relative to the inner portion of the striker head from a first position where the inner and outer portions of the striker head are spaced and at least one of the positive contact or negative contact is within the opening in the inner portion of the striker head and a second position where the inner and outer portions of the striker head are closer together and the one of the positive contact or negative contact extends from the inner portion of the striker head toward the rear portion of the housing, and means for electrically connecting the positive and negative conductive rings with the positive and negative contacts, respectively, on the contact member, wherein when a target object is forcibly engaged with the striker shaft tip so as to move the striker shaft inwardly of the housing, the outer portion of the striker head is moved toward the rear portion of the housing relative to the inner portion of the striker head to the second position so that the one of the positive contact or negative contact of the contact member extends from the inner portion of the striker head to engage the propellant igniting means for completing an electrical firing circuit to enable firing of the device by electrical power supplied through the firing circuit to the propellant igniting means, and wherein the one of the positive or negative contacts that is within the opening in the inner portion of the striker head in the first position comprises an electrically conductive housing operatively connected to the outer portion of the striker head for movement with the outer portion of the striker head.

3. A firing system for an impact generating apparatus as recited in claim 2, wherein the electrically conductive housing has an axial bore for receiving a contact element and further comprises a spring disposed within the axial bore for biasing the contact element outwardly of the electrically conductive housing and towards the driver assembly.

4. A firing system for an impact generating apparatus including a housing defining an interior chamber with a front portion and a rear portion, the firing system comprising:

a striker assembly having a first end and a second end and movably disposed within the front portion of the housing, the striker assembly comprising, a striker head disposed at the first end of the striker assembly, the striker head having inner and outer portions which are moveable relative to one another and the inner portion of the striker head having an opening, and a striker shaft mounted to the outer portion of the striker head and extending outwardly of the front portion of the housing and terminating in the second end of the striker assembly;

a driver assembly having a first end and a second end and containing a propellant charge, the driver assembly disposed within the rear portion of the housing so that the first end of the driver assembly is adjacent the inner portion of the striker head;

means responsive to an electrical charge for igniting the propellant, the propellant igniting means disposed on the first end of the driver assembly;

an electrical power supply associated with the housing; and a firing circuit comprising,
    electrical contacts connected to the power supply and adapted to be positioned in the housing adjacent the inner portion of the striker head,
    positive and negative electrically conductive rings disposed around the inner portion of the striker head and operatively connected to the electrical contacts in the housing,
    an electrically conductive contact member including a positive contact and a negative contact, the contact member disposed within the striker head for movement with the outer portion of the striker head and relative to the inner portion of the striker head from a first position where the inner and outer portions of the striker head are spaced and at least one of the positive contact or negative contact is within the opening in the inner portion of the striker head and a second position where the inner and outer portions of the striker head are closer together and the one of the positive contact or negative contact extends from the inner portion of the striker head toward the rear portion of the housing, and
    means for electrically connecting the positive and negative conductive rings with the positive and negative contacts, respectively, on the contact member,
wherein when a target object is forcibly engaged with the striker shaft tip so as to move the striker shaft inwardly of the housing, the outer portion of the striker head is moved toward the rear portion of the housing relative to the inner portion of the striker head to the second position so that the one of the positive contact or negative contact of the contact member extends from the inner portion of the striker head to engage the propellant igniting means for completing an electrical firing circuit to enable firing of the device by electrical power supplied through the firing circuit to the propellant igniting means and wherein one of the positive or negative contacts is disposed in the inner portion of the striker head so that at least a portion of the contact engages the driver assembly in the first position.

5. A firing system for an impact generating apparatus as recited in claim 4, further comprising means for biasing the contact engaging the driver assembly towards the driver assembly.

6. A firing system for an impact generating apparatus including a housing defining an interior chamber with a front portion and a rear portion, the firing system comprising:

a striker assembly having a first end and a second end and movably disposed within the front portion of the housing, the striker assembly comprising,
    a striker head disposed at the first end of the striker assembly, the striker head having inner and outer portions which are moveable relative to one another and the inner portion of the striker head having an opening, and
    a striker shaft mounted to the outer portion of the striker head and extending outwardly of the front portion of the housing and terminating in the second end of the striker assembly;

a driver assembly having a first end and a second end and containing a propellant charge, the driver assembly disposed within the rear portion of the housing so that the first end of the driver assembly is adjacent the inner portion of the striker head;

means responsive to an electrical charge for igniting the propellant, the propellant igniting means disposed on the first end of the driver assembly;

an electrical power supply associated with the housing; and a firing circuit comprising,
    electrical contacts connected to the power supply and adapted to be positioned in the housing adjacent the inner portion of the striker head,
    positive and negative electrically conductive rings disposed around the inner portion of the striker head and operatively connected to the electrical contacts in the housing,
    an electrically conductive contact member including a positive contact and a negative contact, the contact member disposed within the striker head for movement with the outer portion of the striker head and relative to the inner portion of the striker head from a first position where the inner and outer portions of the striker head are spaced and at least one of the positive contact or negative contact is within the opening in the inner portion of the striker head and a second position where the inner and outer portions of the striker head are closer together and the one of the positive contact or negative contact extends from the inner portion of the striker head toward the rear portion of the housing, and
    means for electrically connecting the positive and negative conductive rings with the positive and negative contacts, respectively, on the contact member,
wherein when a target object is forcibly engaged with the striker shaft tip so as to move the striker shaft inwardly of the housing, the outer portion of the striker head is moved toward the rear portion of the housing relative to the inner portion of the striker head to the second position so that the one of the positive contact or negative contact of the contact member extends from the inner portion of the striker head to engage the propellant igniting means for completing an electrical firing circuit to enable firing of the device by electrical power supplied through the firing circuit to the propellant igniting means, and wherein the inner portion of the striker head has two axially-spaced transverse passages extending radially outwardly from the opening in the inner portion of the striker head to the periphery of the inner portion of the striker head, and wherein the means for electrically connecting the positive and negative conductive rings with the positive and negative contacts comprise spring-biased contact pin assemblies disposed in the transverse passages.

7. A firing system for an impact generating apparatus including a housing defining an interior chamber with a front portion and a rear portion, the firing system comprising:

a striker assembly having a first end and a second end and movably disposed within the front portion of the housing, the striker assembly comprising,
    a striker head disposed at the first end of the striker assembly, the striker head having inner and outer portions which are moveable relative to one another and the inner portion of the striker head having an opening, and
    a striker shaft mounted to the outer portion of the striker head and extending outwardly of the front portion of the housing and terminating in the second end of the striker assembly;

a driver assembly having a first end and a second end and containing a propellant charge, the driver assembly disposed within the rear portion of the housing so that the first end of the driver assembly is adjacent the inner portion of the striker head;

means responsive to an electrical charge for igniting the propellant, the propellant igniting means disposed on the first end of the driver assembly;

an electrical power supply associated with the housing; and a firing circuit comprising,
 electrical contacts connected to the power supply and adapted to be positioned in the housing adjacent the inner portion of the striker head,
 positive and negative electrically conductive rings disposed around the inner portion of the striker head and operatively connected to the electrical contacts in the housing,
 an electrically conductive contact member including a positive contact and a negative contact, the contact member disposed within the striker head for movement with the outer portion of the striker head and relative to the inner portion of the striker head from a first position where the inner and outer portions of the striker head are spaced and at least one of the positive contact or negative contact is within the opening in the inner portion of the striker head and a second position where the inner and outer portions of the striker head are closer together and the one of the positive contact or negative contact extends from the inner portion of the striker head toward the rear portion of the housing, and
 means for electrically connecting the positive and negative conductive rings with the positive and negative contacts, respectively, on the contact member, wherein when a target object is forcibly engaged with the striker shaft tip so as to move the striker shaft inwardly of the housing, the outer portion of the striker head is moved toward the rear portion of the housing relative to the inner portion of the striker head to the second position so that the one of the positive contact or negative contact of the contact member extends from the inner portion of the striker head to engage the propellant igniting means for completing an electrical firing circuit to enable firing of the device by electrical power supplied through the firing circuit to the propellant igniting means, and wherein the propellant igniting means comprises a primer, the ignition of the primer initiating burning of the propellant.

8. A firing system for an impact generating apparatus as recited in claim 7, wherein the first end of the driver assembly has an axial passageway opening into the driver assembly containing the propellant charge and the primer is disposed in the axial passageway.

9. A firing system for an impact generating apparatus as recited in claim 8, wherein the portion of the driver assembly defining the axial passageway is composed of an electrically conductive material and is in electrical communication with the primer.

10. A firing system for an impact generating apparatus as recited in claim 8, wherein the one of the positive or negative contacts that is within the opening in the inner portion of the striker head in the first position comprises an electrically conductive housing operatively connected to the outer portion of the striker head for movement with the outer portion of the striker head.

11. A firing system for an impact generating apparatus as recited in claim 10, wherein the electrically conductive housing has an axial bore for receiving a contact element and further comprises a spring disposed within the axial bore for biasing the contact element outwardly of the electrically conductive housing and towards the driver assembly.

12. A firing system for an impact generating apparatus as recited in claim 10, wherein one of the positive or negative contacts is disposed in the inner portion of the striker head so that at least a portion of the contact engages the driver assembly in the first position.

13. A firing system for an impact generating apparatus as recited in claim 12, further comprising means for biasing the contact engaging the driver assembly towards the driver assembly.

14. A firing system for an impact generating apparatus as recited in claim 12, wherein the inner portion of the striker head has two axially-spaced transverse passages extending radially outwardly from the opening in the inner portion of the striker head to the periphery of the inner portion of the striker head, and wherein the means for electrically connecting the positive and negative conductive rings with the positive and negative contacts comprise spring-biased contact pin assemblies disposed in the transverse passages.

15. A firing system for an impact generating apparatus including a housing defining an interior chamber with a front portion and a rear portion, the firing system comprising:

a striker assembly having a first end and a second end and movably disposed within the front portion of the housing, the striker assembly comprising,
 a striker head disposed at the first end of the striker assembly, the striker head having inner and outer portions which are moveable relative to one another and the inner portion of the striker head having an opening, and
 a striker shaft mounted to the outer portion of the striker head and extending outwardly of the front portion of the housing and terminating in the second end of the striker assembly;

a driver assembly having a first end and a second end and containing a propellant charge, the driver assembly disposed within the rear portion of the housing so that the first end of the driver assembly is adjacent the inner portion of the striker head;

means responsive to an electrical charge for igniting the propellant, the propellant igniting means disposed on the first end of the driver assembly;

an electrical power supply associated with the housing; and a firing circuit comprising,
 electrical contacts connected to the power supply and adapted to be positioned in the housing adjacent the inner portion of the striker head,
 positive and negative electrically conductive rings disposed around the inner portion of the striker head and operatively connected to the electrical contacts in the housing,
 an electrically conductive contact member including a positive contact and a negative contact, the contact member disposed within the striker head for movement with the outer portion of the striker head and relative to the inner portion of the striker head from a first position where the inner and outer portions of the striker head are spaced and at least one of the positive contact or negative contact is within the opening in the inner portion of the striker head and a second position where the inner and outer portions of the striker head are closer together and the one of the positive contact or negative contact extends from the inner portion of the striker head toward the rear portion of the housing, and means for electrically connecting the positive and negative conductive rings with the positive and negative contacts, respectively, on the contact member, wherein when a target object is forcibly engaged with the striker shaft tip so as to move the striker shaft inwardly of the housing, the outer portion of the striker head is moved toward the rear portion of the housing relative to the inner portion of the striker head to the second position so that the one of the positive contact or negative contact of the contact member extends from the inner portion of the striker head to engage the propellant igniting means for completing an electrical firing circuit to enable firing of the device by electrical power supplied through the firing circuit to the propellant igniting means, and wherein the driver assembly comprises:

a hollow tube member having a first closed end and a second open end, the tube member adapted to be disposed in the housing so that the first closed end of the tube member is proximate the inner portion of the striker head, the tube member movable relative to the housing from a first firing position to a second driven position;

a nozzle member sealably mounted in the second end of the tube and having a plurality of openings;

a piston disposed in the tube for movement relative to the tube;

a fluid disposed in the tube between the nozzle member and the piston; and means for sealing the openings in the nozzle member, wherein the nozzle opening sealing means is adapted to rupture when the pressure in the tube exceeds a predetermined pressure, wherein, upon ignition of the propellant, combustion gases build pressure in the tube member between the piston and the closed end of the tube member causing the pressure in the tube member to exceed the predetermined pressure for rupturing the nozzle sealing means causing the piston to move toward the nozzle member and fluid to be expelled through the nozzle member for moving the drive member to the driven position whereby recoil action is cushioned by the fluid exiting the tube member through the nozzle openings as the piston moves toward the nozzle.

16. A firing system for an impact generating apparatus as recited in claim 15, wherein the piston divides the interior chamber defined by the hollow tube member and nozzle into a first variable volume chamber between the piston and first closed end of the tube and a second variable volume chamber between the piston and nozzle member and wherein the ratio of the volume of propellant to the initial volume of the first variable volume chamber is chosen so that the burning propellant generates a pressure in the first variable volume chamber which after an initial post-ignition increase is relatively constant over time.

17. A firing system for an impact generating apparatus as recited in claim 16, wherein the ratio of the volume of propellant to the initial volume of the first variable volume chamber is about 0.075.

18. A firing system for an impact generating apparatus as recited in claim 15, wherein the piston is cup-shaped with the open face of the cup-shaped piston facing in the direction of the closed end of the tube.

19. A firing system for an impact generating apparatus as recited in claim 18, wherein the open face of the piston has a central recess for receiving the propellant charge and further comprising means for retaining the propellant in the piston recess.

20. A firing system for an impact generating apparatus as recited in claim 15, wherein the fluid is liquid $CO_2$.

21. A firing system for an impact generating apparatus as recited in claim 20, wherein $CO_2$ occupies at least about 50% of the volume of the second variable volume chamber.

22. A firing system for an impact generating apparatus as recited in claim 20, wherein $CO_2$ occupies up to about 95% of the volume of the second variable volume chamber.

23. A firing system for an impact generating apparatus as recited in claim 20, wherein $CO_2$ occupies from about 50% to about 95% of the volume of the second variable volume chamber.

24. A firing system for an impact generating apparatus as recited in claim 20, wherein $CO_2$ occupies about 75% of the volume of the second variable volume chamber.

25. A firing system for an impact generating apparatus as recited in claim 15, wherein the first closed end of the tube has a passage therethrough, and the propellant ignition means comprises a primer disposed in the passage wherein the apparatus is fired by igniting the primer which initiates burning of the propellant.

26. A firing system for an impact generating apparatus as recited in claim 15, wherein the nozzle member opening sealing means comprises burst discs.

* * * * *